US011866967B2

(12) United States Patent
Yoshida

(10) Patent No.: US 11,866,967 B2
(45) Date of Patent: Jan. 9, 2024

(54) LOCKING STRUCTURE FOR OPENING AND CLOSING BODY AND ELECTRONIC DEVICE

(71) Applicant: FUJIFILM Business Innovation Corp., Tokyo (JP)

(72) Inventor: Michiaki Yoshida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 769 days.

(21) Appl. No.: 16/847,671

(22) Filed: Apr. 14, 2020

(65) Prior Publication Data

US 2021/0140209 A1 May 13, 2021

(30) Foreign Application Priority Data

Nov. 7, 2019 (JP) ................................ 2019-202183

(51) Int. Cl.
*E05C 3/12* (2006.01)

(52) U.S. Cl.
CPC ........... *E05C 3/12* (2013.01); *E05Y 2900/606* (2013.01)

(58) Field of Classification Search
CPC ... E05C 3/12; E05C 19/022; E05Y 2900/606; H05K 5/0221
See application file for complete search history.

(56) References Cited

U.S. PATENT DOCUMENTS 4,792,165 A * 12/1988 Nishimura ............ E05C 19/022 292/DIG. 4
4,881,764 A * 11/1989 Takahashi ............. E05C 19/066 292/13
5,518,282 A * 5/1996 Sawada ............... E05B 17/2011 292/252
5,520,313 A * 5/1996 Toshihide .............. B60N 3/102 224/280
7,806,446 B2 * 10/2010 Oh ............................ B60R 7/06 292/137
7,920,373 B2 4/2011 Matsubara
2010/0246109 A1 * 9/2010 Matsubara ......... G03G 21/1633 361/679.01

FOREIGN PATENT DOCUMENTS

JP 2010232296 10/2010

* cited by examiner

*Primary Examiner* — Grant Sitta
(74) *Attorney, Agent, or Firm* — JCIPRNET

(57) ABSTRACT

A locking structure for an opening and closing body includes an opening and closing body that is supported to be movable between an open position where an opening formed in a device main body is opened and a closed position where the opening is closed and a push latch device that is disposed in the device main body, locks the opening and closing body at the closed position as an engaging body, which is provided on the opening and closing body to protrude in a pushing direction, pushes in a latch body, and releases locking of the opening and closing body to push out the opening and closing body in an opposite direction to the pushing direction in a case where the engaging body is further pushed in at the closed position. Even in a case where the opening and closing body is pushed at the closed position in the pushing direction, the opening and closing body does not move, and the push latch device is held in a locked state.

11 Claims, 13 Drawing Sheets

LOCKING STRUCTURE FOR OPENING AND CLOSING BODY AND ELECTRONIC DEVICE

CROSS-REFERENCE TO RELATED APPLICATIONS

This application is based on and claims priority under 35 USC 119 from Japanese Patent Application No. 2019-202183 filed Nov. 7, 2019.

BACKGROUND

(i) Technical Field

The present invention relates to a locking structure for an opening and closing body and an electronic device.

(ii) Related Art

There is known an opening and closing device for a lid including a lid, in which one end part thereof is attached to a device main body via a pivot shaft so as to bring an opening formed in the device main body into an open state and a closed state and an engaging part is disposed on a device main body side of the other end part on an opposite side to a side to which the pivot shaft is attached, a push latch device which is disposed in the device main body and brings the lid and the device main body into a locked state and an unlocked state by pressing the engaging part of the lid, and a pivot restricting part, which abuts against the lid to prohibit the pivoting of the lid before the engaging part engages with the push latch device. An elastic deformation part which is deformable toward the device main body side is formed at the other end part of the lid where the engaging part is disposed. When the elastic deformation part is pressed in a state where pivoting of the lid is restricted by the pivot restricting part, the deformed engaging part presses the push latch device, bringing the lid into the locked state or the unlocked state with respect to the device main body (JP2010-232296A).

SUMMARY

Aspects of non-limiting embodiments of the present disclosure relate to a locking structure for an opening and closing body and an electronic device that can prevent locking from being unintentionally released as an opening and closing body other than an operating body is pushed even in a case where a push latch is used.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a locking structure for an opening and closing body including an opening and closing body that is supported to be movable between an open position where an opening formed in a device main body is opened and a closed position where the opening is closed, and a push latch device that is disposed in the device main body, locks the opening and closing body at the closed position as an engaging body, which is provided on the opening and closing body to protrude in a pushing direction, pushes in a latch body, and releases locking of the opening and closing body to push out the opening and closing body in an opposite direction to the pushing direction in a case where the engaging body is further pushed in at the closed position. Even in a case where the opening and closing body is pushed at the closed position in the pushing direction, the opening and closing body does not move, and the push latch device is held in a locked state.

BRIEF DESCRIPTION OF THE DRAWINGS

Exemplary embodiment(s) of the present invention will be described in detail based on the following figures, wherein:

DETAILED DESCRIPTION (1) Configuration of Locking Structure for Opening and Closing Body FIG. 1 is a perspective view illustrating a front side of an image forming apparatus 100 to which a locking structure for an opening and closing body 1 according to the exemplary embodiment is applied. FIG. 2 is a perspective view illustrating the locking structure for an opening and closing body 1 seen from the front side. FIGS. 3A to 3C are views illustrating an operation of a push latch device 120. FIGS. 4A and 4B are schematic cross-sectional views illustrating an operation of a protruding body 142 of a restricting body 140. FIG. 5 is a perspective view illustrating the locking structure for an opening and closing body 1 seen from a back side.

Hereinafter, a configuration of the locking structure for an opening and closing body 1 will be described with reference to the drawings.

(1.1) Overall Configuration of Locking Structure for Opening and Closing Body

Figure 1:
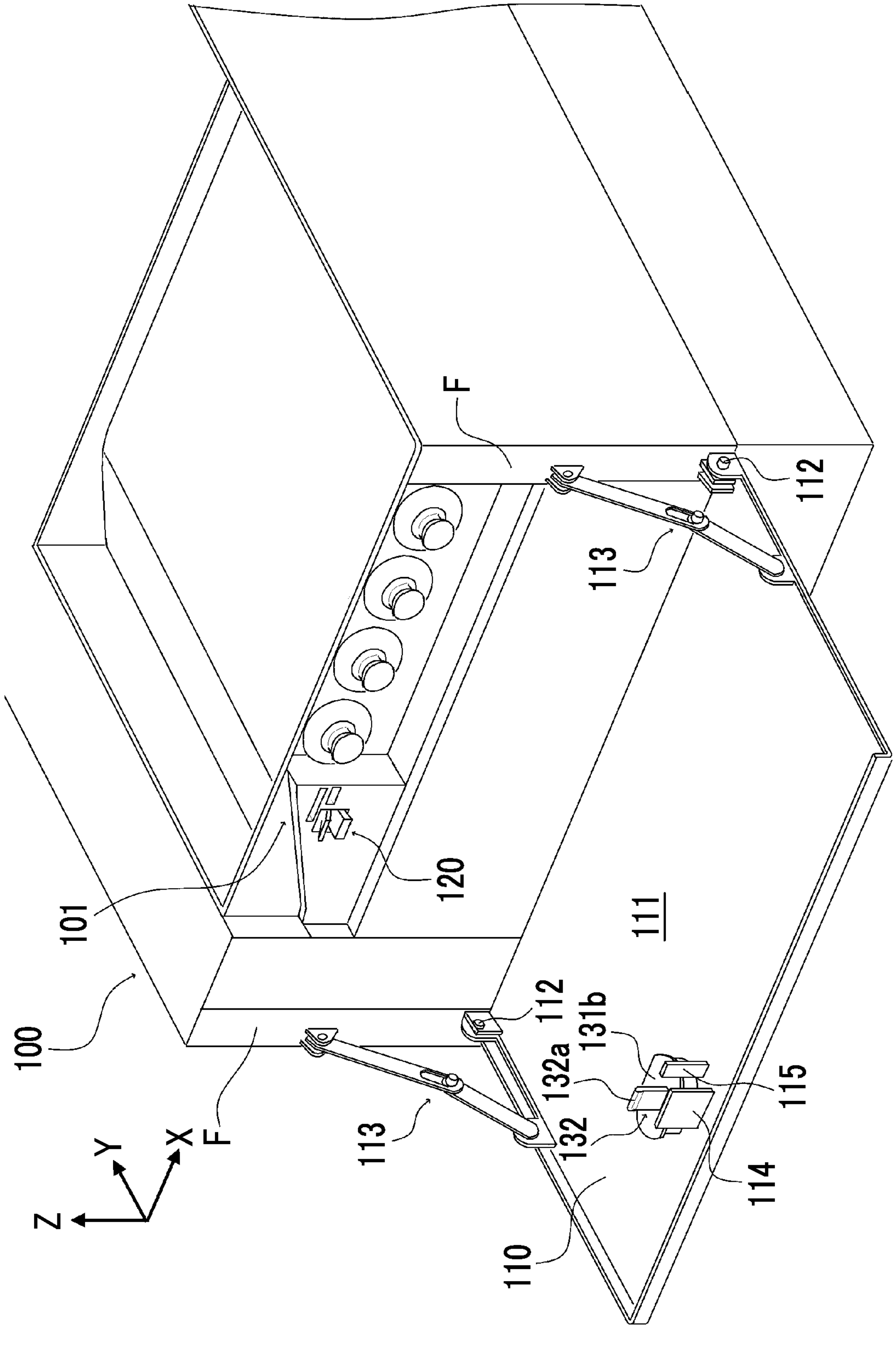
FIG. 1 is a perspective view illustrating a front side of an image forming apparatus to which a locking structure for an opening and closing body according to the exemplary embodiment is applied.

As illustrated in FIG. 1, the locking structure for an opening and closing body 1 openably and closably connects a main body housing F of the image forming apparatus 100, which is an example of an electronic device, and a front cover 110, which is an example of an opening and closing body covering an opening 101 of the image forming apparatus 100, to each other.

The main body housing F is provided with the push latch device 120, and the front cover 110 is provided with an engaging body 130 including an operating body 131 and an engaging claw 132. In a case where the front cover 110 is moved to a closed position, the engaging claw 132 of the engaging body 130 is pushed into the push latch device 120, and the front cover 110 is locked at the closed position where the opening 101 is covered.

(1.2) Front Cover

FIG. 1 illustrates a state where the front cover 110 is at an open position where the opening 101 of the image forming apparatus 100 is opened. The front cover 110 includes a flat plate part 111 of which the entire part has a thin plate shape so as to close the opening 101 of the image forming apparatus 100 at the closed position and a rotation fulcrum 112 that is rotatably supported by the main body housing F, and is connected to the main body housing F by an open leg link mechanism 113 so as to be rotatable and movable between the open position and the closed position.

Figure 2:
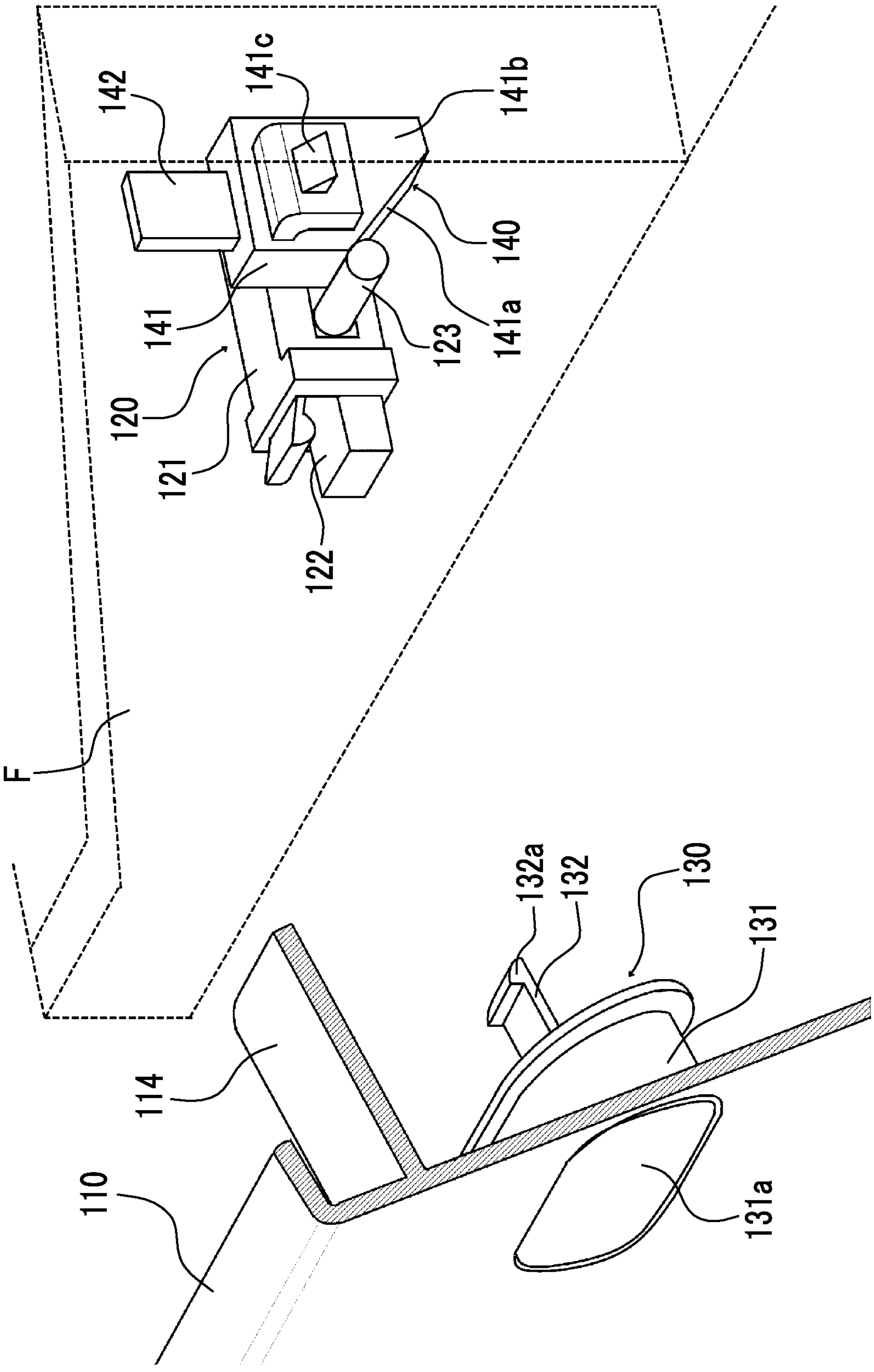
FIG. 2 is a perspective view illustrating the locking structure for an opening and closing body seen from the front side.

On the flat plate part 111, the engaging body 130 including the operating body 131 and the engaging claw 132 is provided so as to be movable with a predetermined stroke with respect to the flat plate part 111. As illustrated in FIG. 2, a front surface 131*a* of the operating body 131 is exposed to the outside from the flat plate part 111. In a case of releasing the engagement of the front cover 110 at the closed position, the engagement is released as an operator presses the operating body 131. The engaging claw 132 is provided to protrude from an inner surface 131*b* of the operating body 131, and a claw portion 132*a* is formed at a distal end thereof.

On the flat plate part 111, a first rib body 114 and a second rib body 115 are provided to protrude adjacent to the operating body 131. In a case of being pushed in a state where the front cover 110 is locked at the closed position, the first rib body 114 interferes with the protruding body 142 of the restricting body 140 to be described later, thereby preventing movement of the front cover 110 in a pushing direction.

In a case where the front cover 110 moves to the closed position and further makes an overstroke to a main body housing F side, the second rib body 115 supports, from below, a protrusion 141*c* formed on a side surface 141*b* of the restricting body 140 to be described below and the restricting body 140 is held in a state of being moved upward (Z-direction).

(1.3) Push Latch Device

As illustrated in FIG. 2, the push latch device 120 and the restricting body 140 are attached to the main body housing F. The push latch device 120 includes a latch main body 121 and a latch body 122 that can be engaged with and disengaged from the engaging body 130 provided on the front cover 110.

Figure 3A:
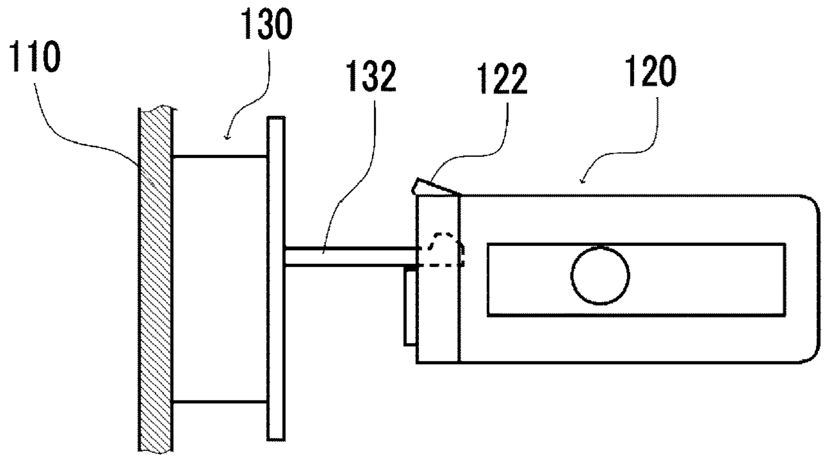
FIGS. 3A to 3C are views illustrating an operation of a push latch device.
Figure 3B:
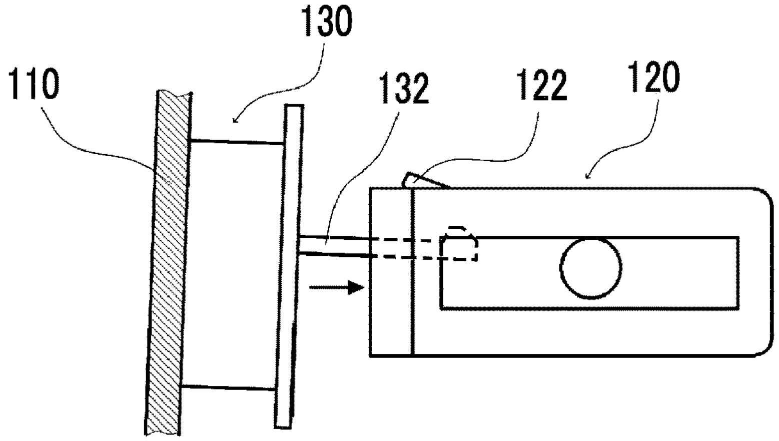
Figure 3C:
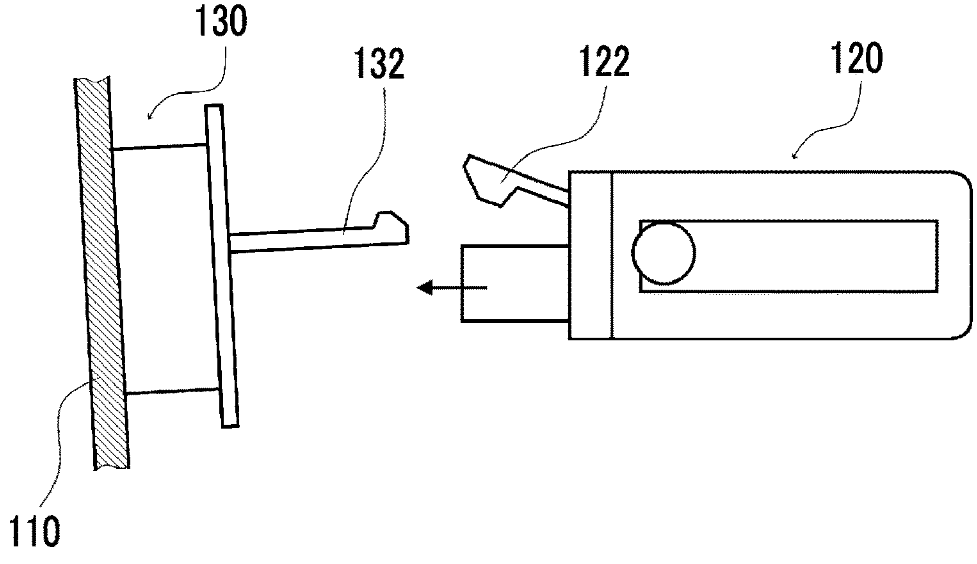

The latch body 122 includes a known holding mechanism that holds the engaging claw 132, which is provided to protrude from the engaging body 130, at two positions including a holding position where the engaging claw is held at a pushed position as illustrated in FIG. 3A and a protruding position where the engaging claw projects forward (−Y-direction) as illustrated in FIG. 3C after a holding state is released as the engaging claw is further pushed in from the holding position as illustrated in FIG. 3B.

The push latch device 120 locks the front cover 110 at the closed position as the engaging body 130 pushes in the latch body 122 by the holding mechanism. In a case where the engaging body 130 is further pushed in at the closed position, the locking of the front cover 110 is released and the front cover 110 is pushed out in an opposite direction to the pushing direction.

The latch body 122 of the push latch device 120 according to the exemplary embodiment is integrally provided with an arm part 123 protruding in a horizontal direction (X-direction) intersecting a moving direction of the latch body 122. The arm part 123 comes into contact with a slope part 141*a* of a main body 141 of the restricting body 140 to be described later to press the main body 141 with the movement of the latch body 122, thereby moving the restricting body 140 upward (Z-direction).

(1.4) Restricting Body

The restricting body 140 includes the main body 141 and the protruding body 142 that is movable in an up-and-down direction inside the main body 141, and is provided adjacent to the push latch device 120 so as to be movable in the up-and-down direction (Z-direction) with respect to the main body housing F.

As illustrated in FIG. 2, the slope part 141*a* that is inclined toward the arm part 123 of the latch body 122 of the push latch device 120 is formed on the main body 141. The slope part 141*a* comes into contact with the arm part 123 protruding in the horizontal direction (X-direction) from the latch body 122, and the main body 141 is movable upward (Z-direction) with the movement of the latch body 122 in the pushing direction (Y-direction).

Figure 4B:
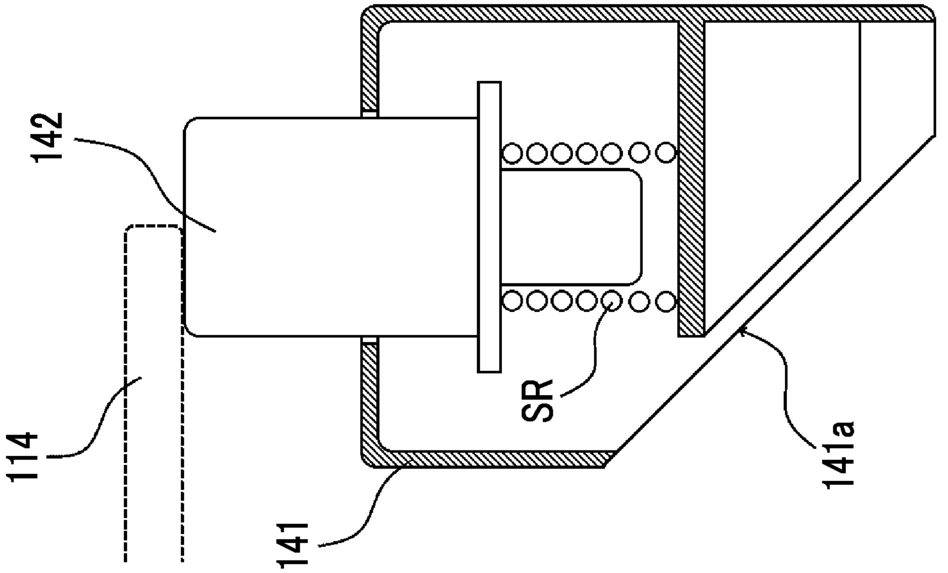
FIGS. 4A and 4B are schematic cross-sectional views illustrating an operation of a protruding body of a restricting body.
Figure 4A:
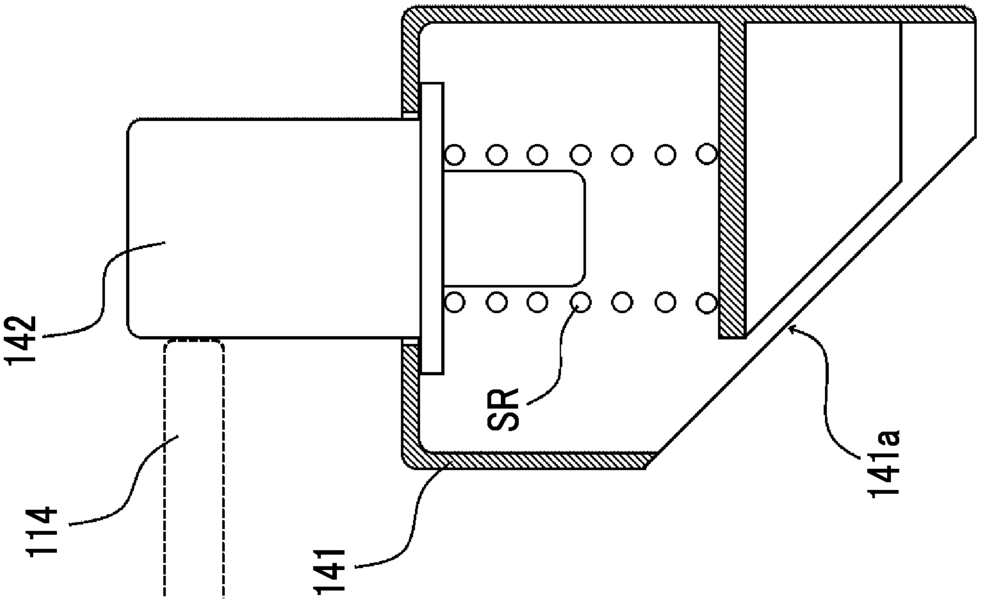

As illustrated in FIGS. 4A and 4B, the protruding body 142 is elastically biased upward (Z-direction) by a spring SR inside the main body 141 and protrudes upward from the main body 141. In a state where the front cover 110 is locked at the closed position, the protruding body 142 protrudes to a position where the protruding body interferes with a movement trajectory of the front cover 110 to prevent the movement of the front cover 110 in the pushing direction.

Figure 5:
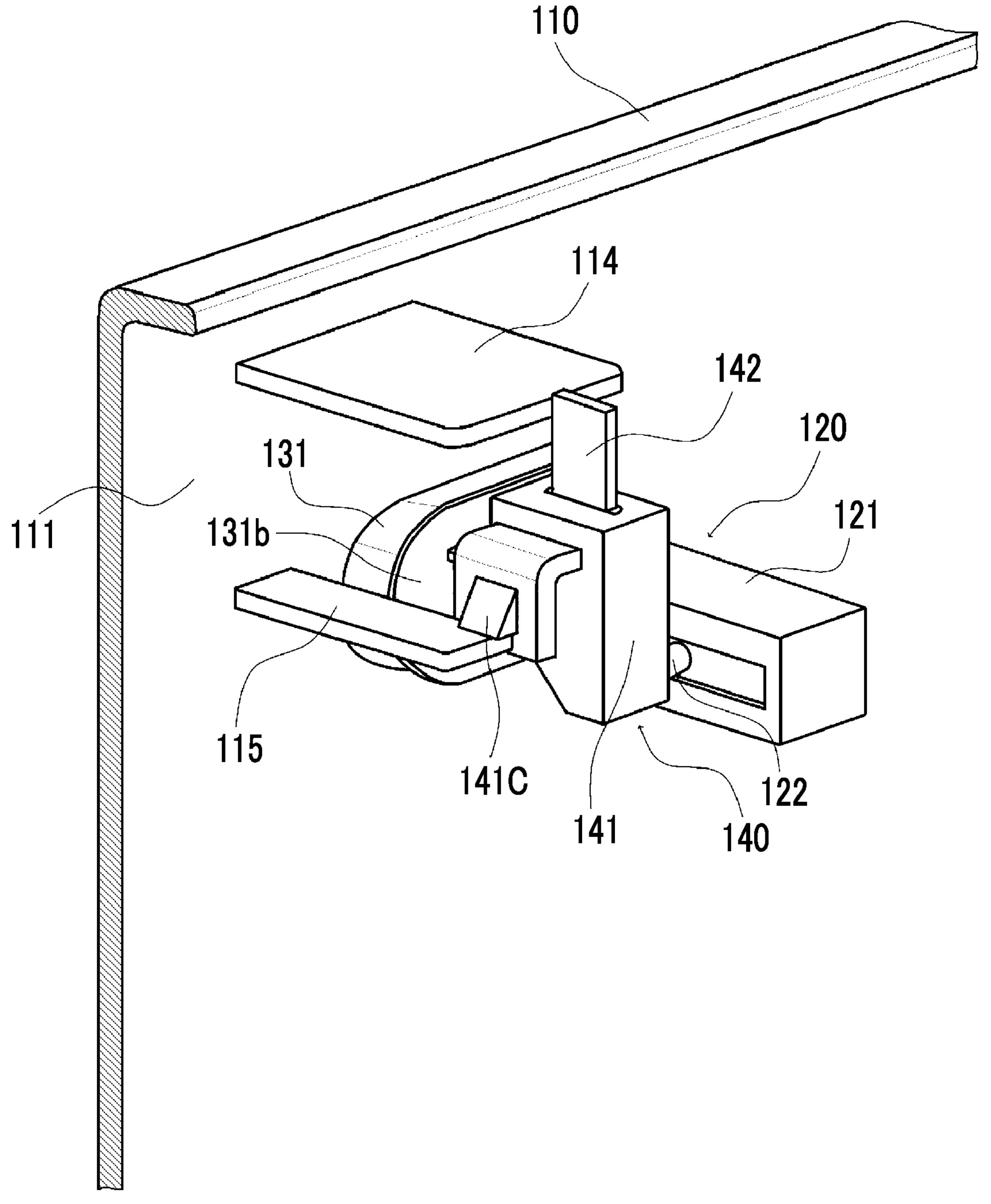
FIG. 5 is a perspective view illustrating the locking structure for an opening and closing body seen from a back side.

On the side surface 141*b* of the main body 141, the protrusion 141*c* that protrudes in the horizontal direction (X-direction) intersecting the up-and-down direction (Z-direction) is formed. As illustrated in FIG. 5, in a case where the front cover 110 moves to the closed position and further makes an overstroke to the main body housing F side, the protrusion 141*c* is supported by the second rib body 115 that protrudes from the flat plate part 111 of the front cover 110. In a case where the front cover 110 returns to the closed position, the main body 141 is held in a state of being moved upward (Z-direction).

Accordingly, in a state where the front cover 110 has returned to the closed position, the restricting body 140 is held in a state of being moved upward (Z-direction), and the protruding body 142 protruding upward from the main body 141 interferes with the first rib body 114 that protrudes from the flat plate part 111 of the front cover 110 to prevent the movement of the front cover 110 in the pushing direction.

(2) Engaging Operation of Locking Structure for Opening and Closing Body

Figure 6:
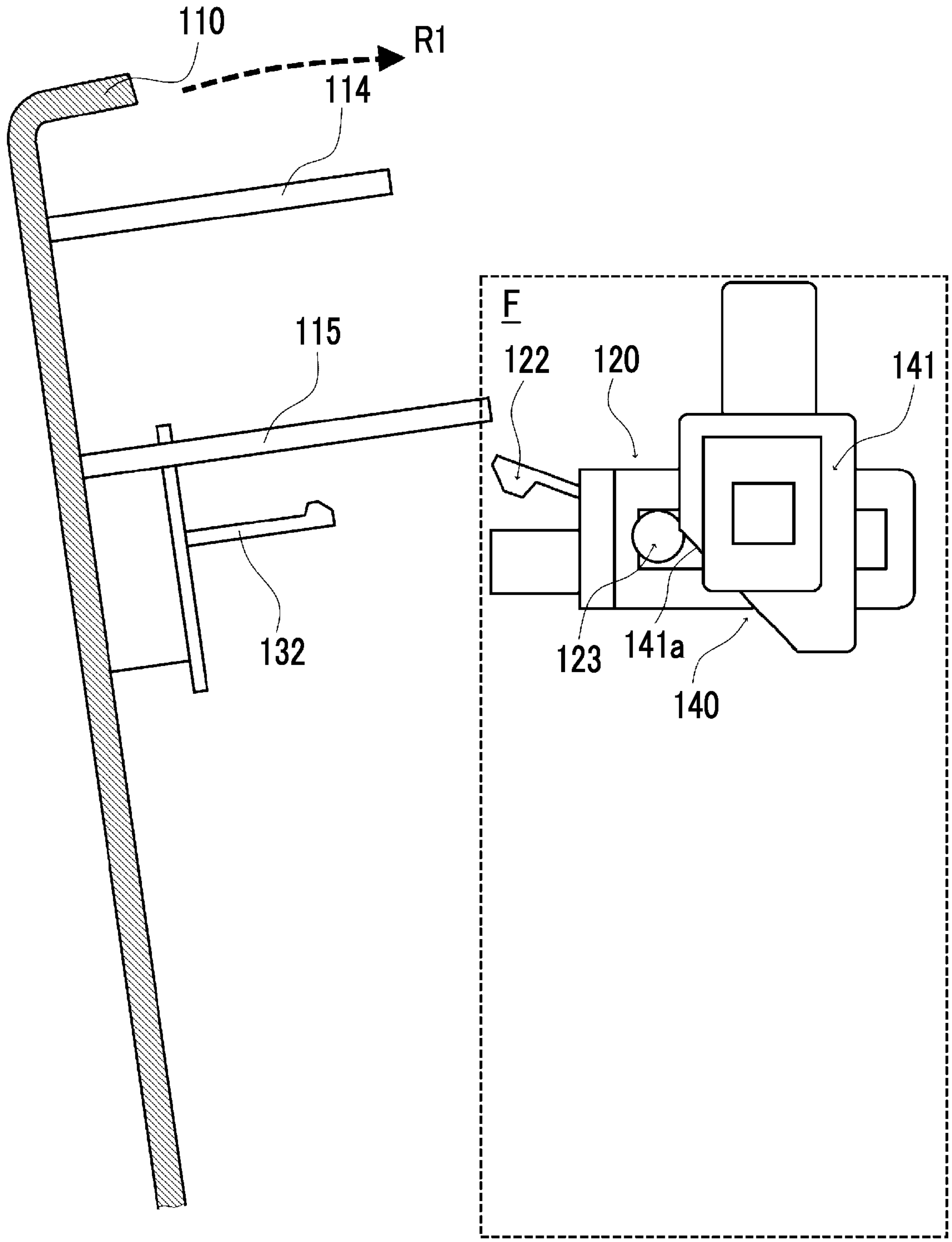
FIG. 6 is a schematic cross-sectional view illustrating an operation state of the locking structure for an opening and closing body before an engaging body comes into contact with the push latch device.
Figure 7:
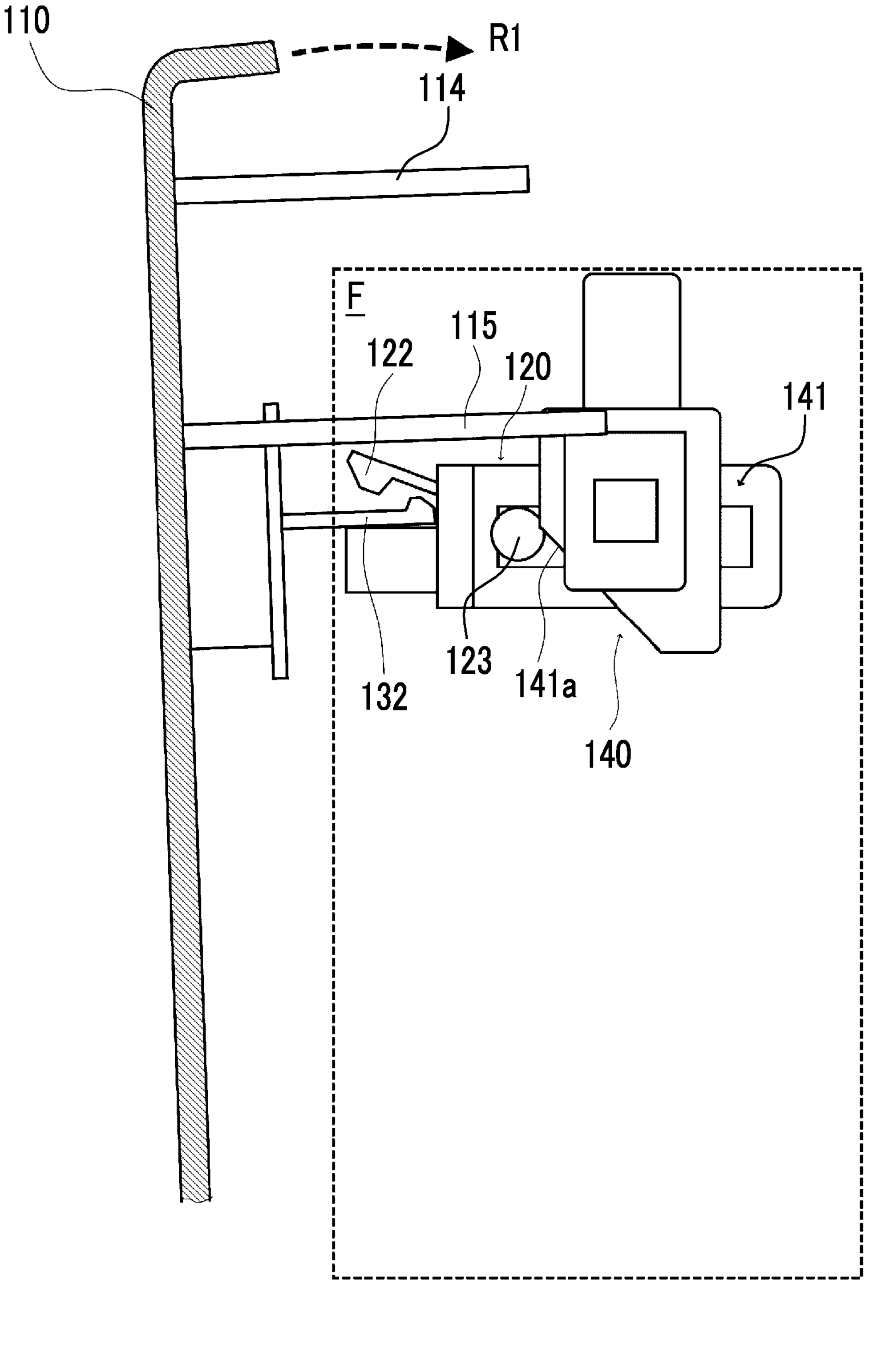
FIG. 7 is a schematic cross-sectional view illustrating an operation state of the locking structure for an opening and closing body when the engaging body starts coming into contact with the push latch device.
Figure 8:
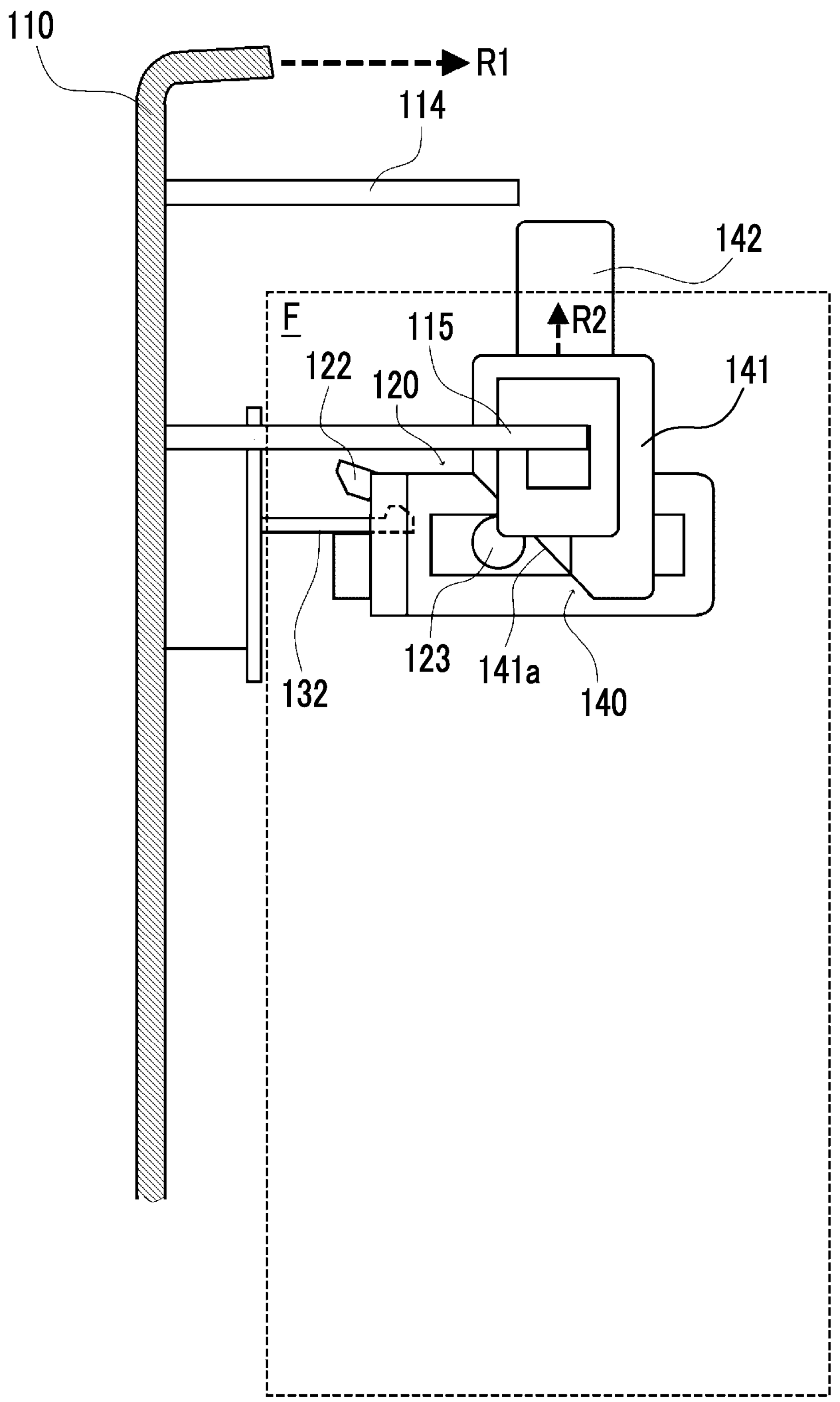
FIG. 8 is a schematic cross-sectional view illustrating an operation state of the locking structure for an opening and closing body when the engaging body is engaged with the push latch device.
Figure 9:
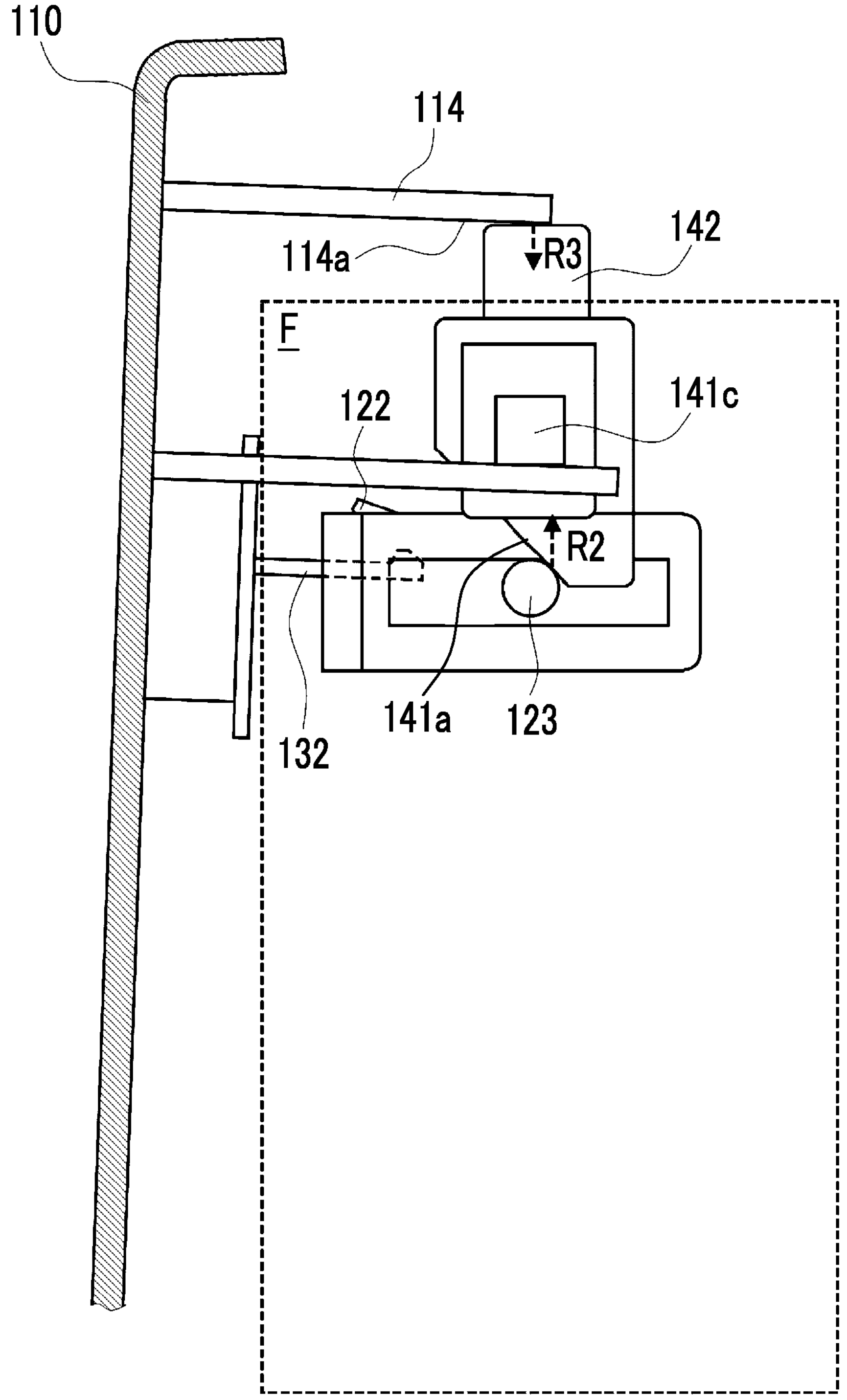
FIG. 9 is a schematic cross-sectional view illustrating an operation state of the locking structure for an opening and closing body when the front cover has made an overstroke to a push latch device side.
Figure 10:
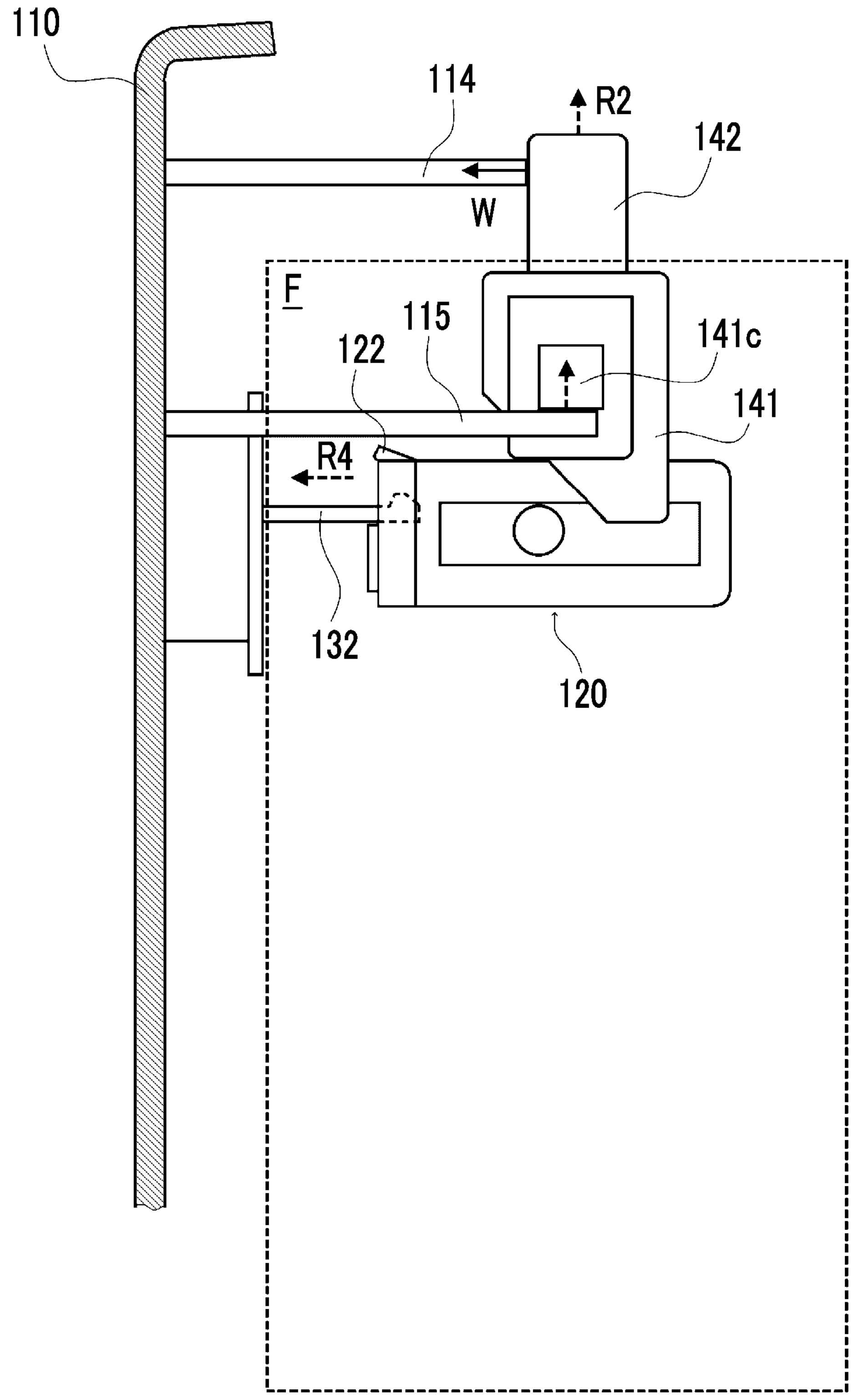
FIG. 10 is a schematic cross-sectional view illustrating an operation state of the locking structure for an opening and closing body when the front cover is locked at a closed position.

FIG. 6 is a schematic cross-sectional view illustrating an operation state of the locking structure for an opening and closing body 1 before the engaging body 130 comes into contact with the push latch device 120. FIG. 7 is a schematic cross-sectional view illustrating an operation state of the locking structure for an opening and closing body 1 when the engaging body 130 starts coming into contact with the push latch device 120. FIG. 8 is a schematic cross-sectional view illustrating an operation state of the locking structure for an opening and closing body 1 when the engaging body 130 is engaged with the push latch device 120. FIG. 9 is a schematic cross-sectional view illustrating an operation state of the locking structure for an opening and closing body 1 when the front cover 110 has made an overstroke to a push latch device 120 side. FIG. 10 is a schematic cross-sectional view illustrating an operation state of the locking structure for an opening and closing body 1 when the front cover 110 is locked at the closed position.

(2.1) Locking Structure for Opening and Closing Body of Comparative Example

Figure 13:
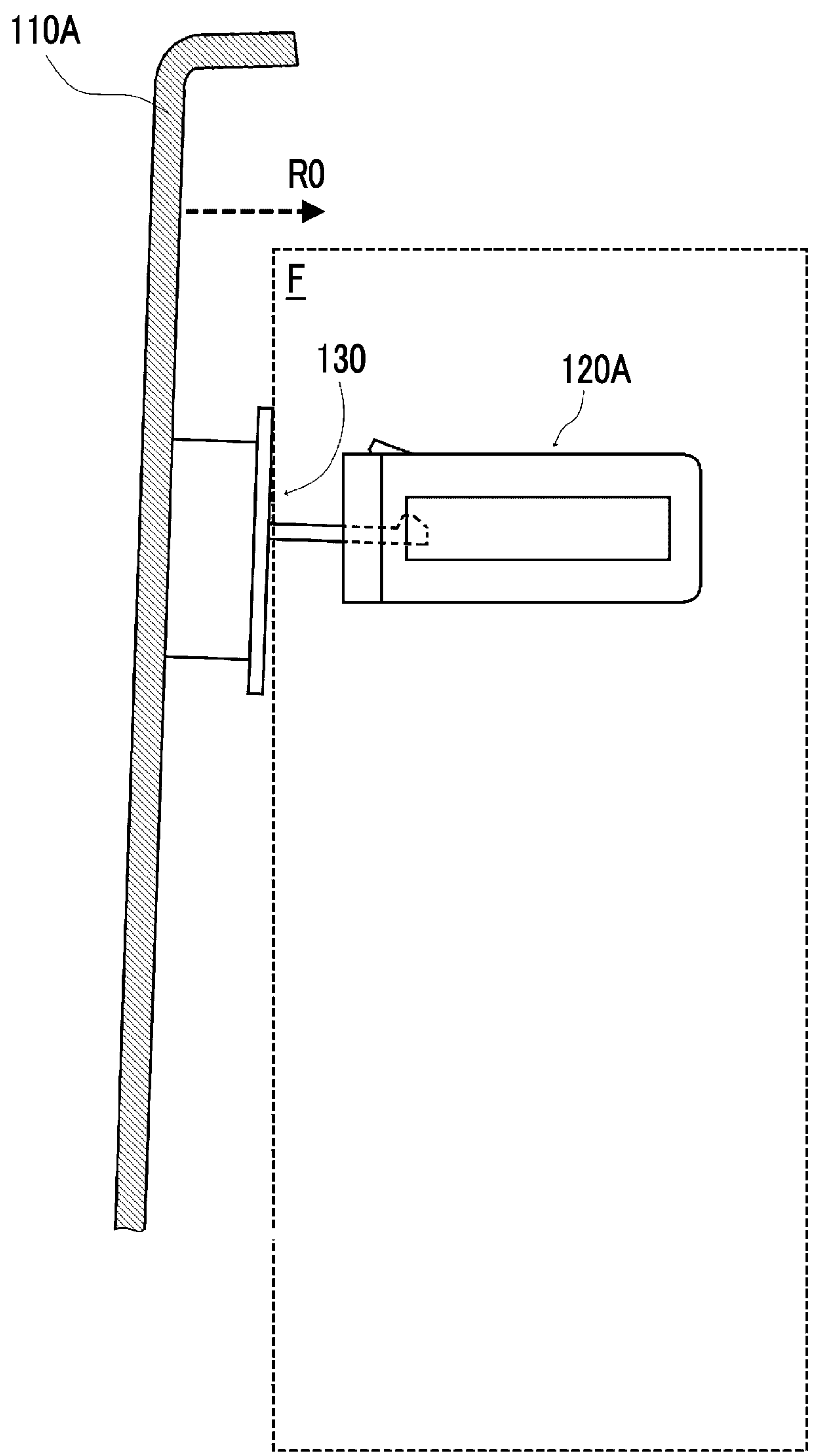
FIG. 13 is a schematic cross-sectional view illustrating disengagement of a front cover of a locking structure for an opening and closing body of a comparative example, which does not include a restricting body.

FIG. 13 is a schematic cross-sectional view illustrating disengagement of a front cover 110A of a locking structure for an opening and closing body 1A of a comparative example, which does not include the restricting body 140.

As illustrated in FIG. 13, in the locking structure for an opening and closing body 1A in which the main body housing F is provided with a push latch device 120A and the restricting body 140 is not included, it is necessary to provide a gap between the front cover 110A and the main body housing F side, which is sufficient for moving the front cover 110A in a case of releasing the engagement of the engaging body 130.

For this reason, in a case where a user of an image forming apparatus 100A unintentionally touches the front cover 110A and pushes a part of the front cover 110A as shown with an arrow R0 in FIG. 13, the engaging body 130 also moves along with the front cover 110A, and the engagement of the push latch device 120A with the engaging body 130 is released so that interlock is opened. Thus, there is a possibility that the operation of the image forming apparatus 100A stops.

(2.2) Locking of Opening and Closing Body at Closed Position

As illustrated in FIG. 6, in a state where the front cover 110 is started to rotate to move from the open position to the closed position (refer to an arrow R1 in FIG. 6), the push latch device 120 provided in the main body housing F is positioned at the protruding position where the latch body 122 has projected forward (−Y-direction).

In this state, the arm part 123 which is provided integrally with the latch body 122 does not come into contact with the slope part 141*a* of the main body 141 of the restricting body 140, and the restricting body 140 does not move upward (Z-direction).

As illustrated in FIG. 7, even in a case where the front cover 110 is rotated to be moved from the open position to the closed position (refer to the arrow R1) and the engaging claw 132 of the engaging body 130 provided on the front cover 110 comes into contact with the latch body 122 of the push latch device 120 provided in the main body housing F, the arm part 123 provided integrally with the latch body 122 does not come into contact with the slope part 141*a* of the main body 141 of the restricting body 140, and the restricting body 140 does not move upward (Z-direction), in a state where the front cover 110 is not further pushed in.

As illustrated in FIG. 8, in a case where the engaging claw 132 of the engaging body 130 is in contact with the latch body 122 of the push latch device 120 and then the front cover 110 is further pushed in as shown with the arrow R1 in FIG. 8, the engaging claw 132 of the engaging body 130 engages with the latch body 122 of the push latch device 120 and is held at the holding position of the push latch device 120.

In this state, although the arm part 123 which is provided integrally with the latch body 122 is in contact with the slope part 141*a* of the main body 141 of the restricting body 140 and the main body 141 is moved upward (Z-direction) as shown with an arrow R2 in FIG. 8, the protruding body 142 does not move to a position where the protruding body interferes with the movement trajectory of the first rib body 114 erected on the front cover 110. For this reason, the front cover 110 is in a movable state so as to further make an overstroke in the pushing direction.

As illustrated in FIG. 9, in a case where the front cover 110 further makes an overstroke to the main body housing F side from a state where the engaging claw 132 is engaged with the latch body 122 of the push latch device 120, the latch body 122 further moves in the pushing direction from the holding position and the main body 141 of the restricting body 140 is pushed upward (Z-direction) by the arm part 123 as shown with the arrow R2 in FIG. 9.

With this operation, the second rib body 115 protruding from the flat plate part 111 of the front cover 110 enters a lower surface of the protrusion 141*c* of the restricting body 140 pushed upward (Z-direction), and the restricting body 140 is held in a state of being moved upward (Z-direction). At this time, the protruding body 142 protruding upward (Z-direction) from the restricting body 140 comes into a state of being pressed down by a lower surface 114*a* of the first rib body 114 protruding from the flat plate part 111 of the front cover 110 (refer to an arrow R3 in FIG. 9).

As illustrated in FIG. 10, in a case where the front cover 110 which has made an overstroke is pushed back to the holding position by the push latch device 120 (refer to an arrow R4 in FIG. 10), the protruding body 142 pressed down by the first rib body 114 protrudes upward (Z-direction) to a position where the protruding body interferes with a movement trajectory of the first rib body 114 (refer to the arrow R2 in FIG. 10).

Accordingly, even in a case where the front cover 110 is pushed to the main body housing F side, the first rib body 114 comes into contact with the protruding body 142 of the restricting body 140, thereby preventing the movement of the front cover 110 in the pushing direction as shown with an arrow Win FIG. 10. That is, even in a case where a user of the image forming apparatus 100 unintentionally touches the front cover 110 and pushes a part of the front cover 110 in a state where the front cover 110 is at the closed position, the movement of the front cover 110 in the pushing direction is prevented by the protruding body 142 of the restricting body 140, and thereby engagement of the push latch device 120 with the engaging body 130 is not released.

(2.3) Disengagement of Opening and Closing Body at Closed Position

Figure 11:
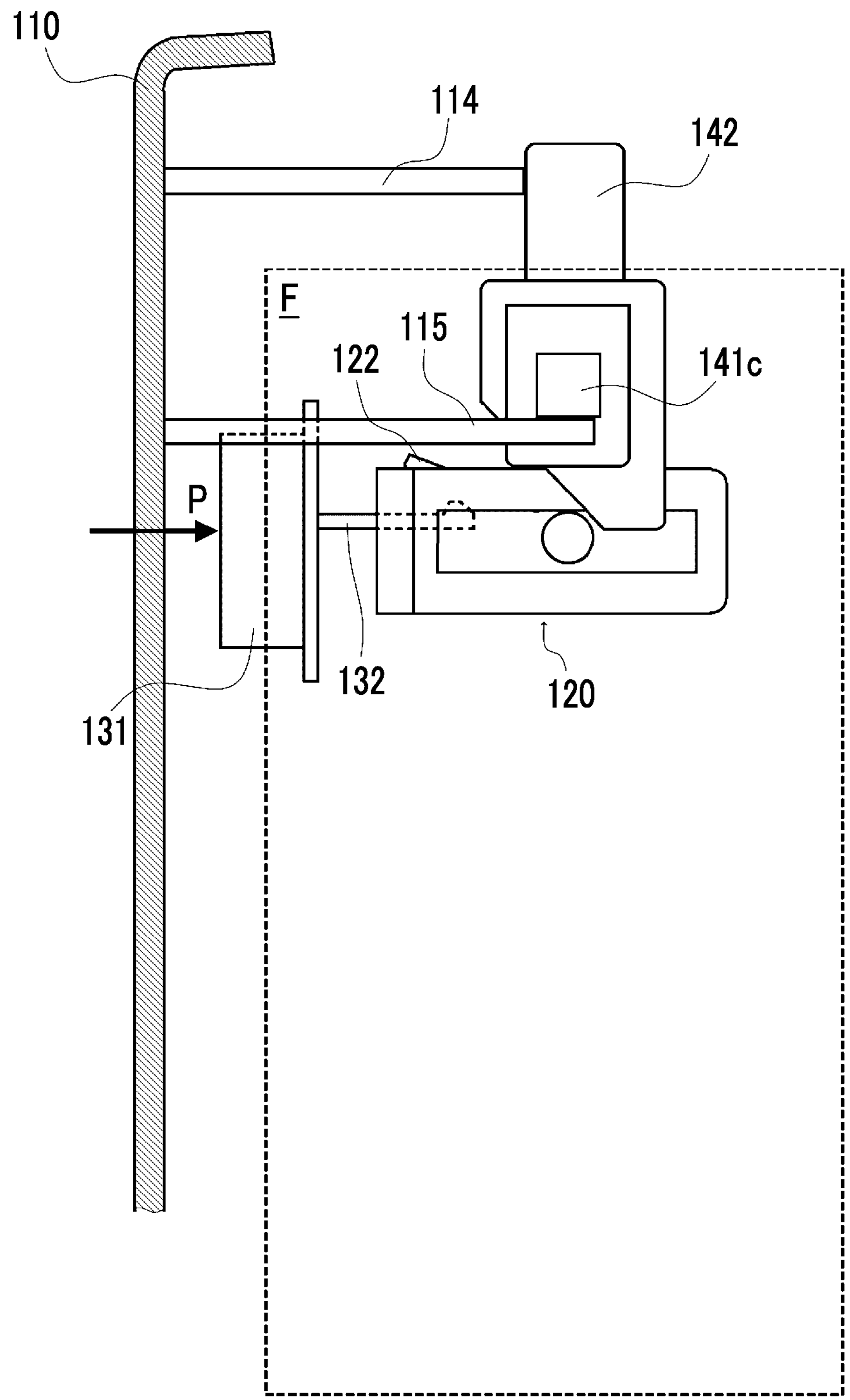
FIG. 11 is a schematic cross-sectional view illustrating an operation of releasing engagement of the front cover locked at the closed position with the push latch device.

FIG. 11 is a schematic cross-sectional view illustrating an operation of releasing engagement of the front cover 110 locked at the closed position with the push latch device 120.

Figure 12:
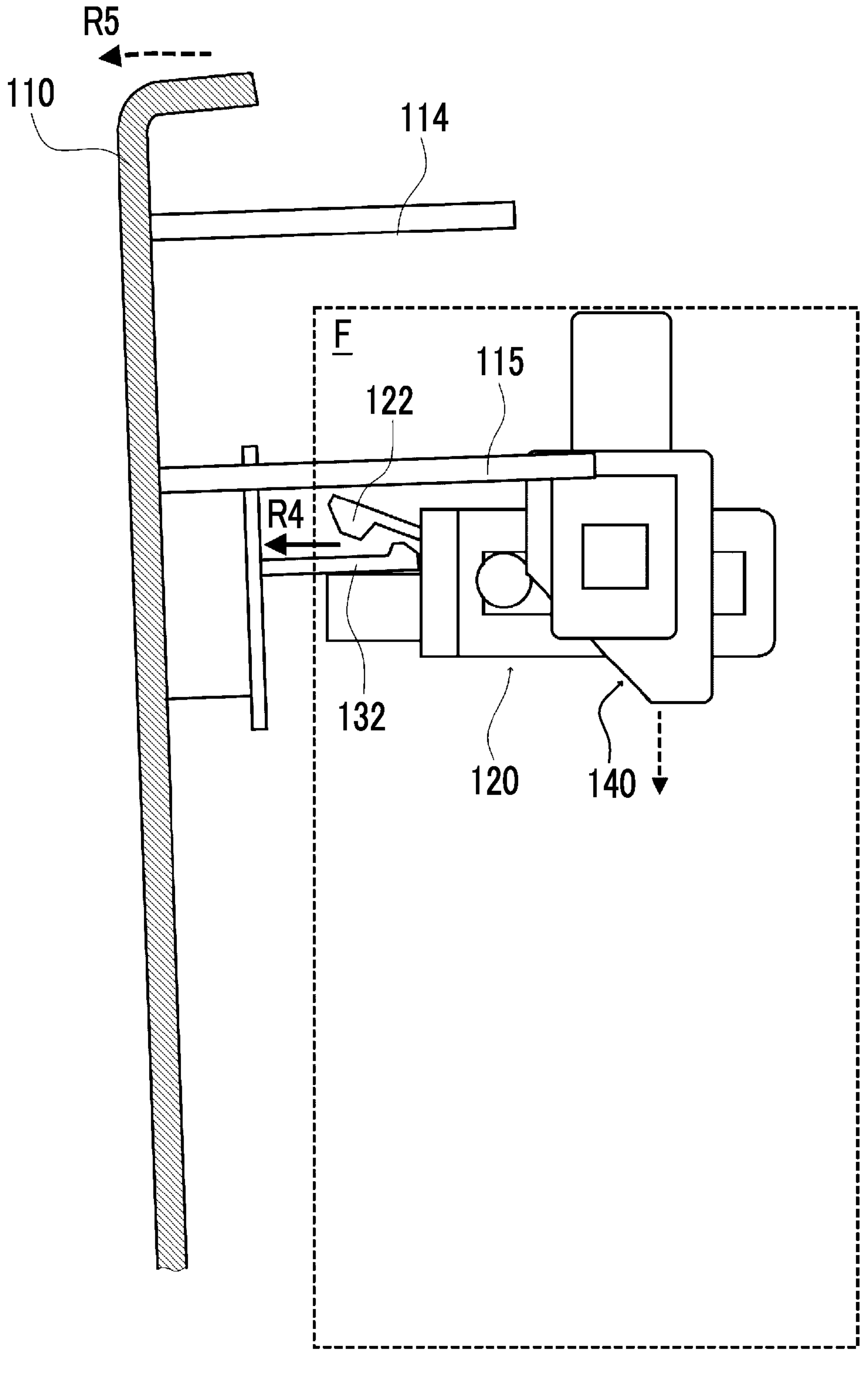
FIG. 12 is a schematic cross-sectional view illustrating a state where engagement of the front cover with the push latch device is released.

FIG. 12 is a schematic cross-sectional view illustrating a state where engagement of the front cover 110 with the push latch device 120 is released.

In a case of releasing engagement between the front cover 110 locked at the closed position and the push latch device 120, engagement between the latch body 122 of the push latch device 120 and the engaging claw 132 is released by pressing the operating body 131 of the engaging body 130, which is provided on the front cover 110 so as to be movable with a predetermined stroke, as shown with an arrow P in FIG. 11.

The push latch device 120 that has released engagement of the front cover 110 with the engaging claw 132 acts to push the front cover 110 in the opposite direction to the pushing direction, as shown with the arrow R4 in FIG. 12. Accordingly, as shown with an arrow R5 in FIG. 12, the locking of the front cover 110 at the closed position is released, thereby coming into a state of being movable to the open position. As described above, in the locking structure for an opening and closing body 1 according to the exemplary embodiment, even in a case where the push latch device 120 is used, it is possible to prevent locking from being unintentionally released as the front cover 110, which is the opening and closing body, other than the operating body 131, is pushed.

Although the locking structure for an opening and closing body 1 of the image forming apparatus 100 including the front cover 110, which is the opening and closing body, has been described in the exemplary embodiment, a manual paper feeding tray that is provided foldably with respect to the apparatus main body or a paper guide that is openably and closably provided on a paper transport path of the image forming apparatus 100 may be used as the opening and closing body.

In addition, without being limited to the image forming apparatus 100, in particular, a device, in which an interlocking mechanism is provided for opening and closing of the opening and closing body and the apparatus main body and a main body thereof is operable by the locking of the opening and closing body at the closed position, can be applied to the electronic device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A locking structure for an opening and closing body comprising:

an opening and closing body that is supported to be movable between an open position where an opening formed in a device main body is opened and a closed position where the opening is closed;

a push latch device that is disposed in the device main body, locks the opening and closing body at the closed position as an engaging body, which is provided on the opening and closing body to protrude in a pushing direction, pushes in a latch body, and releases locking of the opening and closing body to push out the opening and closing body in an opposite direction to the pushing direction in a case where the engaging body is further pushed in at the closed position;

a restricting body that is disposed in the device main body and prevents movement of the opening and closing body positioned at the closed position in the pushing direction, wherein the restricting body is disposed adjacent to the push latch device so as to be movable in an up-and-down direction intersecting the pushing direction, wherein even in a case where the opening and closing body is pushed at the closed position in the pushing direction, the opening and closing body does not move, the restricting body and the opening and closing body come into contact with each other to restrict movement of the opening and closing body, and the push latch device is held in a locked state.

2. The locking structure for an opening and closing body according to claim 1, wherein the restricting body includes a main body that is movable in the up-and-down direction intersecting the pushing direction of the opening and closing body and a protruding body that is elastically biased upward and is movable in the up-and-down direction inside the main body, and the main body is pressed and moved upward by the latch body moving in the pushing direction with movement of the opening and closing body to the closed position to prevent movement of the opening and closing body in the pushing direction.

3. The locking structure for an opening and closing body according to claim 2, wherein in a case where the opening and closing body returns to the closed position after making an overstroke in the pushing direction, the protruding body prevents the movement of the opening and closing body in the pushing direction by being positioned to protrude with respect to a movement trajectory of a rib body, which is provided on the opening and closing body and is provided to protrude in the pushing direction.

4. The locking structure for an opening and closing body according to claim 2, wherein the main body has a protrusion protruding in a horizontal direction intersecting the up-and-down direction, and in a case where the main body is pressed and moved upward by the latch body moving in the pushing direction with movement of the opening and closing body to the closed position, the protrusion is supported by a second rib body provided on the opening and closing body and is held at a position of being moved upward.

5. The locking structure for an opening and closing body according to claim 3, wherein the main body has a protrusion protruding in a horizontal direction intersecting the up-and-down direction, and in a case where the main body is pressed and moved upward by the latch body moving in the pushing direction with movement of the opening and closing body to the closed position, the protrusion is supported by a second rib body provided on the opening and closing body and is held at a position of being moved upward.

6. The locking structure for an opening and closing body according to claim 1, wherein the engaging body includes an operating body inserted into a hole provided in the opening and closing body and an engaging claw protruding in the pushing direction, is disposed to be movable in the pushing direction with respect to the opening and closing body so as to be elastically biased in the opposite direction to the pushing direction, and releases locking of the opening and closing body as the operating body is pushed at the closed position.

7. The locking structure for an opening and closing body according to claim 2, wherein the engaging body includes an operating body inserted into a hole provided in the opening and closing body and an engaging claw protruding in the pushing direction, is disposed to be movable in the pushing direction with respect to the opening and closing body so as to be elastically biased in the opposite direction to the pushing direction, and releases locking of the opening and closing body as the operating body is pushed at the closed position.

8. The locking structure for an opening and closing body according to claim 3, wherein the engaging body includes an operating body inserted into a hole provided in the opening and closing body and an engaging claw protruding in the pushing direction, is disposed to be movable in the pushing direction with respect to the opening and closing body so as to be elastically biased in the opposite direction to the pushing direction, and releases locking of the opening and closing body as the operating body is pushed at the closed position.

9. The locking structure for an opening and closing body according to claim 4, wherein the engaging body includes an operating body inserted into a hole provided in the opening and closing body and an engaging claw protruding in the pushing direction, is disposed to be movable in the pushing direction with respect to the opening and closing body so as to be elastically biased in the opposite direction to the pushing direction, and releases locking of the opening and closing body as the operating body is pushed at the closed position.

10. The locking structure for an opening and closing body according to claim 5, wherein the engaging body includes an operating body inserted into a hole provided in the opening and closing body and an engaging claw protruding in the pushing direction, is disposed to be movable in the pushing direction with respect to the opening and closing body so as to be elastically biased in the opposite direction to the pushing direction, and releases locking of the opening and closing body as the operating body is pushed at the closed position.

11. An electronic device comprising the locking structure for an opening and closing body according to claim 1.

* * * * *